United States Patent [19]
Lo

[11] Patent Number: 5,268,829
[45] Date of Patent: Dec. 7, 1993

[54] STRUCTURE OF LASER POINTER

[76] Inventor: Tien L. Lo, No. 27, Lane 452, Chung Hsing Rd., Pai Yu Village, Kuan Yin Hsiang, Tao Yuan Hsien, Taiwan

[21] Appl. No.: 969,697

[22] Filed: Oct. 28, 1992

[30] Foreign Application Priority Data

May 6, 1992 [DE] Fed. Rep. of Germany ... 9206095[U]

[51] Int. Cl.$^5$ .............................................. F21V 7/00
[52] U.S. Cl. ..................... 362/259; 362/109; 362/253
[58] Field of Search ............... 362/109, 154, 253, 259, 362/800, 102, 157, 253

[56] References Cited

U.S. PATENT DOCUMENTS

| | | | |
|---|---|---|---|
| 4,048,489 | 9/1977 | Giannetti | 362/259 |
| 4,414,610 | 11/1983 | Gale | 362/259 |
| 5,056,097 | 10/1991 | Meyers | 362/259 |

Primary Examiner—James C. Yeung
Attorney, Agent, or Firm—Lowe, Price, LeBlanc & Becker

[57] ABSTRACT

A laser pointer comprised of a projector, a light spot controller, a base, a telescopic stick, a telescopic stick supporting spring plate, a concealed microphone, a laser light generating PC board, a sliding switch knob, an upper cover, a switching control spring plate, a switch control hook, and a witch, wherein rotating said projector causes said light spot control to be moved leftward or rightward permitting a small or big projecting hole to be aligned with said projector for passing a laser light beam produced by said laser light generating PC Board; said switching control spring plate keeps said switch to be maintained off before pressing down said sliding switch knob so as to prevent error triggering.

2 Claims, 7 Drawing Sheets

STRUCTURE OF LASER POINTER

BACKGROUND OF THE INVENTION

The present invention relates to laser pointers, and more particularly, the present invention relates to a laser point which has means to change the pattern of light spot, and means to protect against error triggering.

A variety of laser light generating devices are known and used in pointing things out on a map, blackboard, etc. One disadvantage of the prior art laser pointer devices is that they can only produce a fixed patter or size of light spot. Another disadvantage of the prior art laser pointer devices is that there is no safe means to prevent the problem of error triggering, and therefore much electric power supply is wasted.

SUMMARY OF THE INVENTION

The present invention has been accomplished to eliminate the aforesaid disadvantages. It is therefore an object of the present invention to provide a laser pointer which can be adjusted to change the size and pattern of the light spot produced thereby. It is another object of the present invention to provide a laser pointer which has means to prevent error triggering. According to one aspect of the present invention, a laser pointer is generally comprised of a projector, a light spot controller, a base, a telescopic stick, a telescopic stick supporting spring plate, a concealed microphone, a laser light generating PC board, a sliding switch knob, an upper cover, a switching control spring plate, a switch control hook, and a witch, wherein rotating the projector causes the light spot control to be moved leftward or rightward permitting a small or big projecting hole thereon to be aligned the said projector, according to the desired size of light spot, for passing a laser light beam produced by the laser light generating PC Board. According to another aspect of the present invention, the small and big projecting holes on the light spot controller can be respectively made in any of a variety of shapes. According to still another aspect of the present invention, the switching control spring plate keeps the switch to be maintained off before pressing down the sliding switch knob, so as to prevent error triggering.

DETAILED DESCRIPTION OF THE PREFERRED EMBODIMENT

Figure 1:
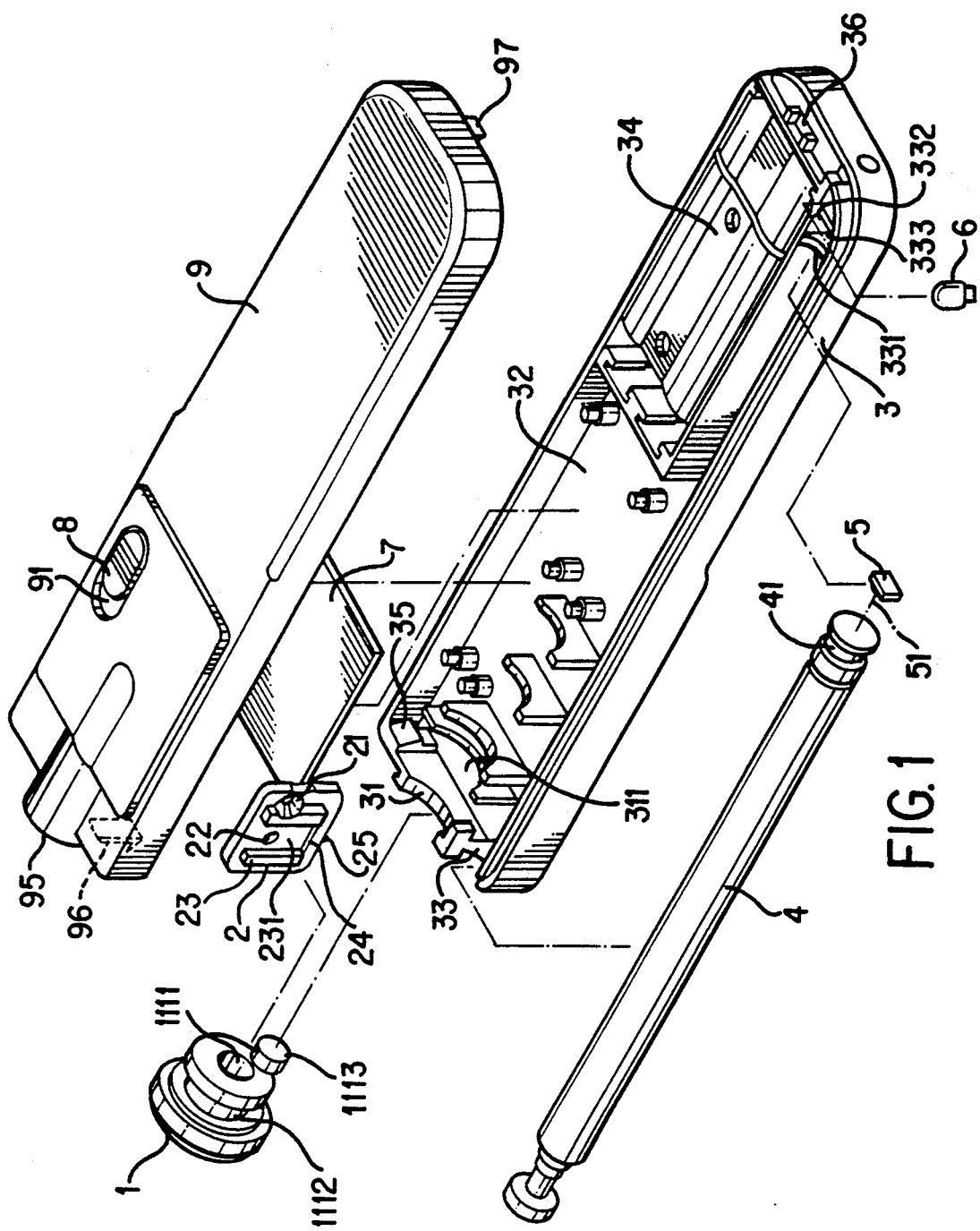
FIG. 1 is an exploded view of a laser pointer embodying the present invention.
Figure 2:
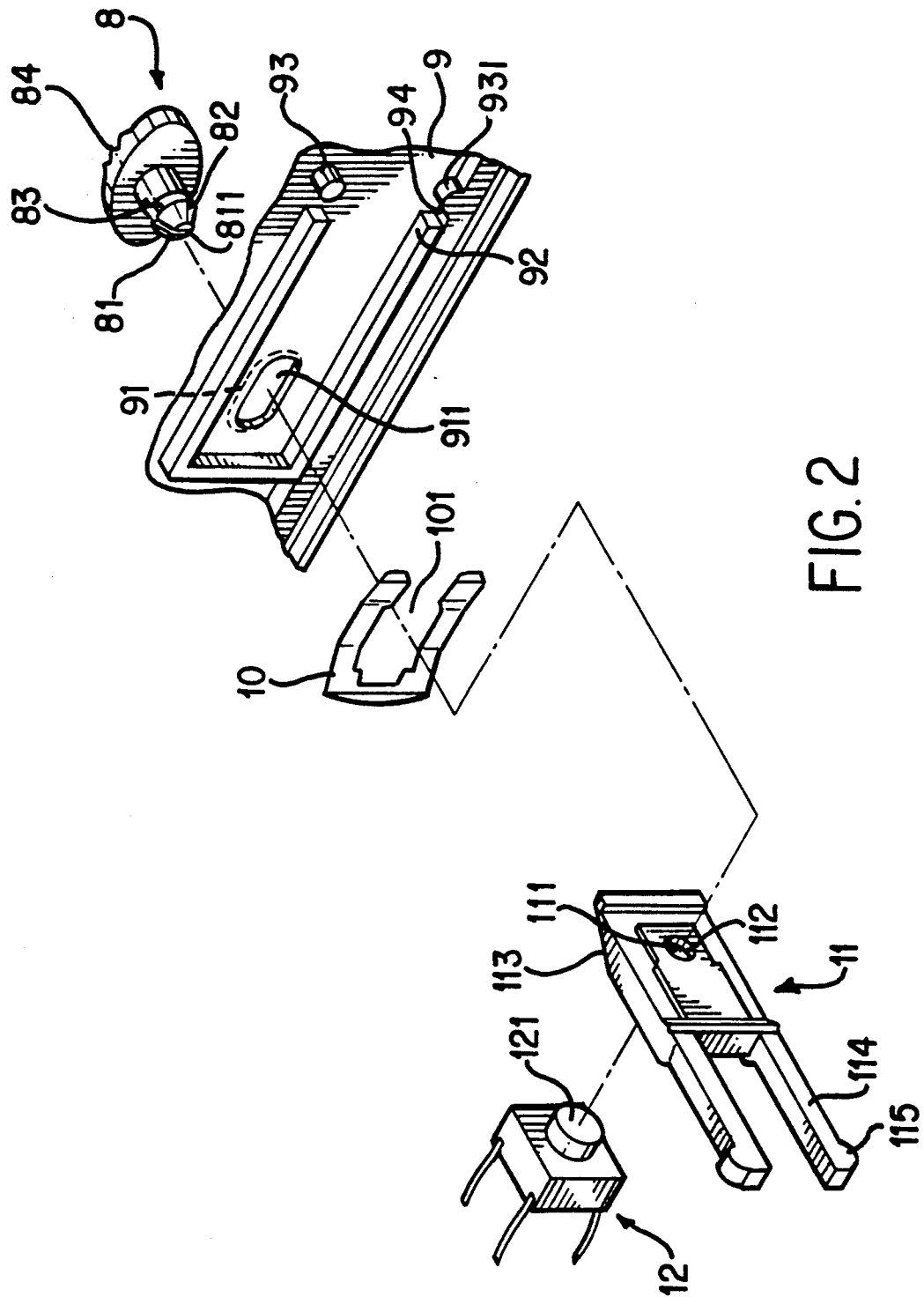
FIG. 2 is an exploded view of the upper cover.
Figure 3:
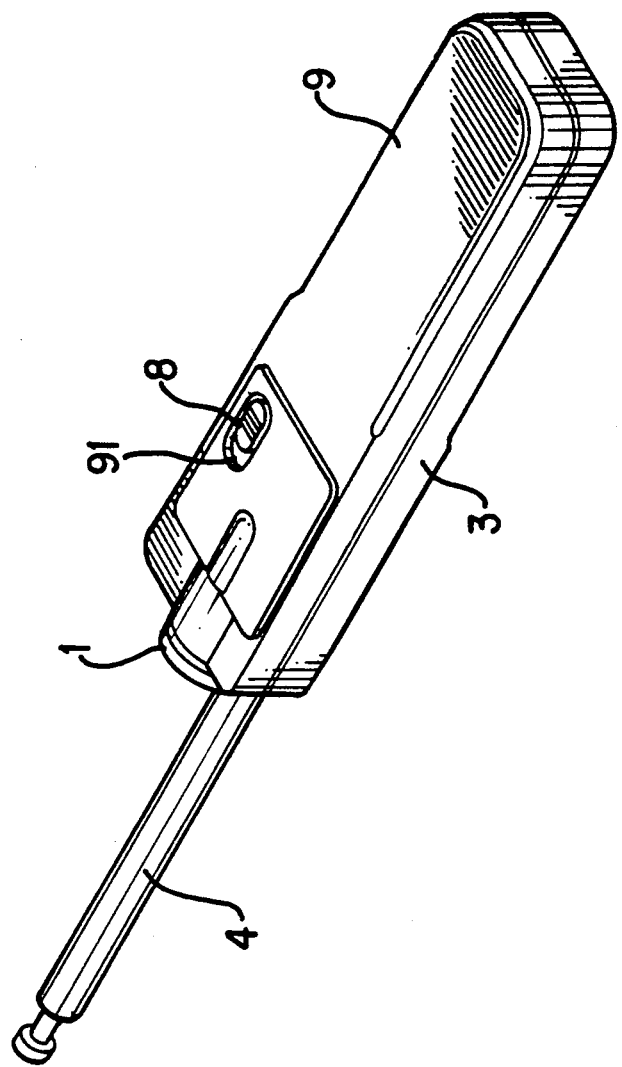
FIG. 3 is an elevational view of the laser pointer of FIG. 1.
Figure 4A:
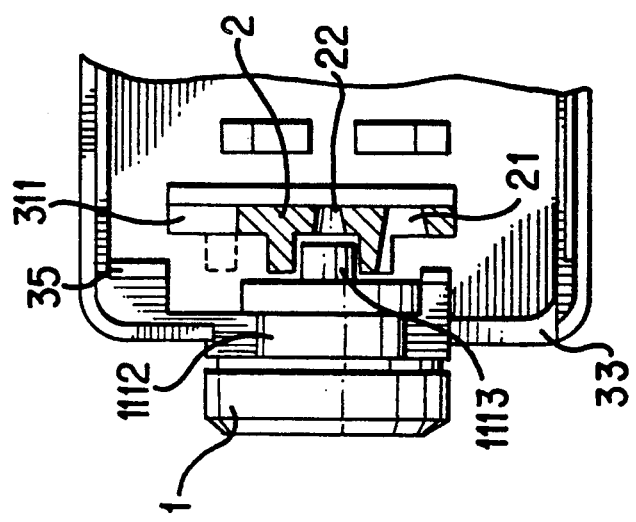
FIG. 4A is a partly sectional view showing that rotating the projector causes the light spot controller to be moved leftward or rightward permitting the small or big projecting hole to be in line with the projector for passing a laser light beam.
Figure 4B:
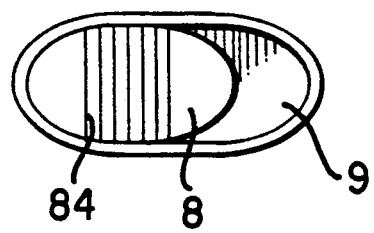
FIGS. 4B and C are fragmentary top and sectional views of the switch mechanism in the on or closed position and FIGS. 4D and E are similar views showing the switch in the open or off position
Figure 4C:
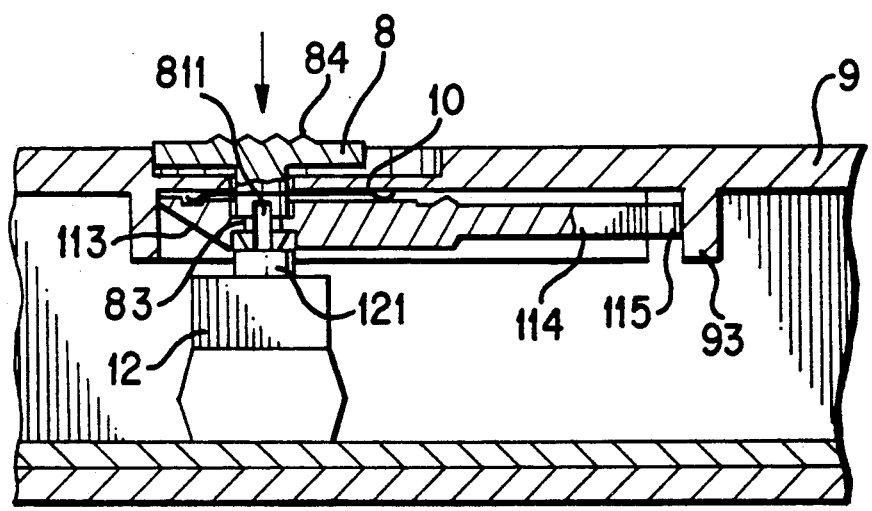
Figure 4D:
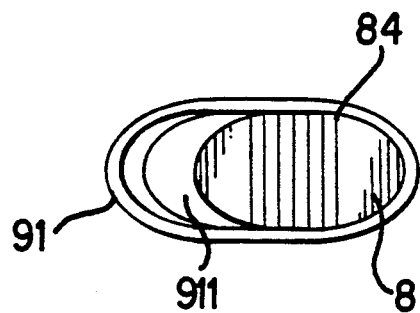
Figure 4E:
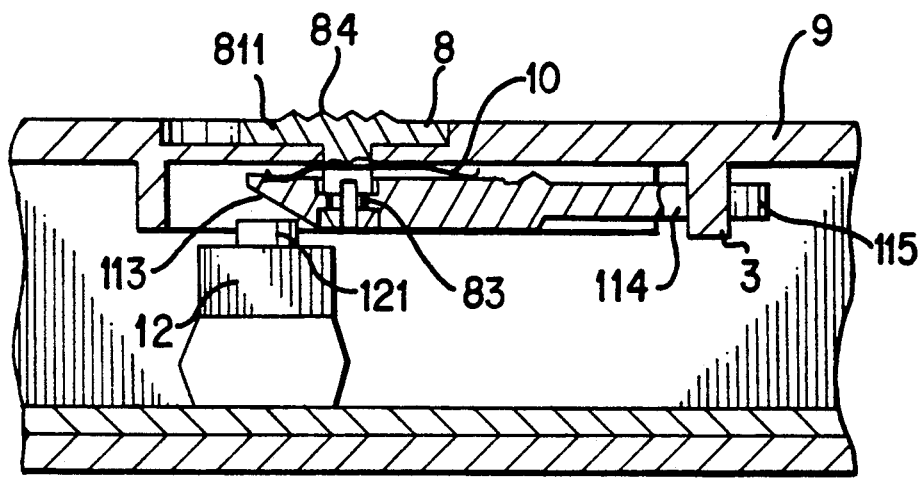
Figure 5:
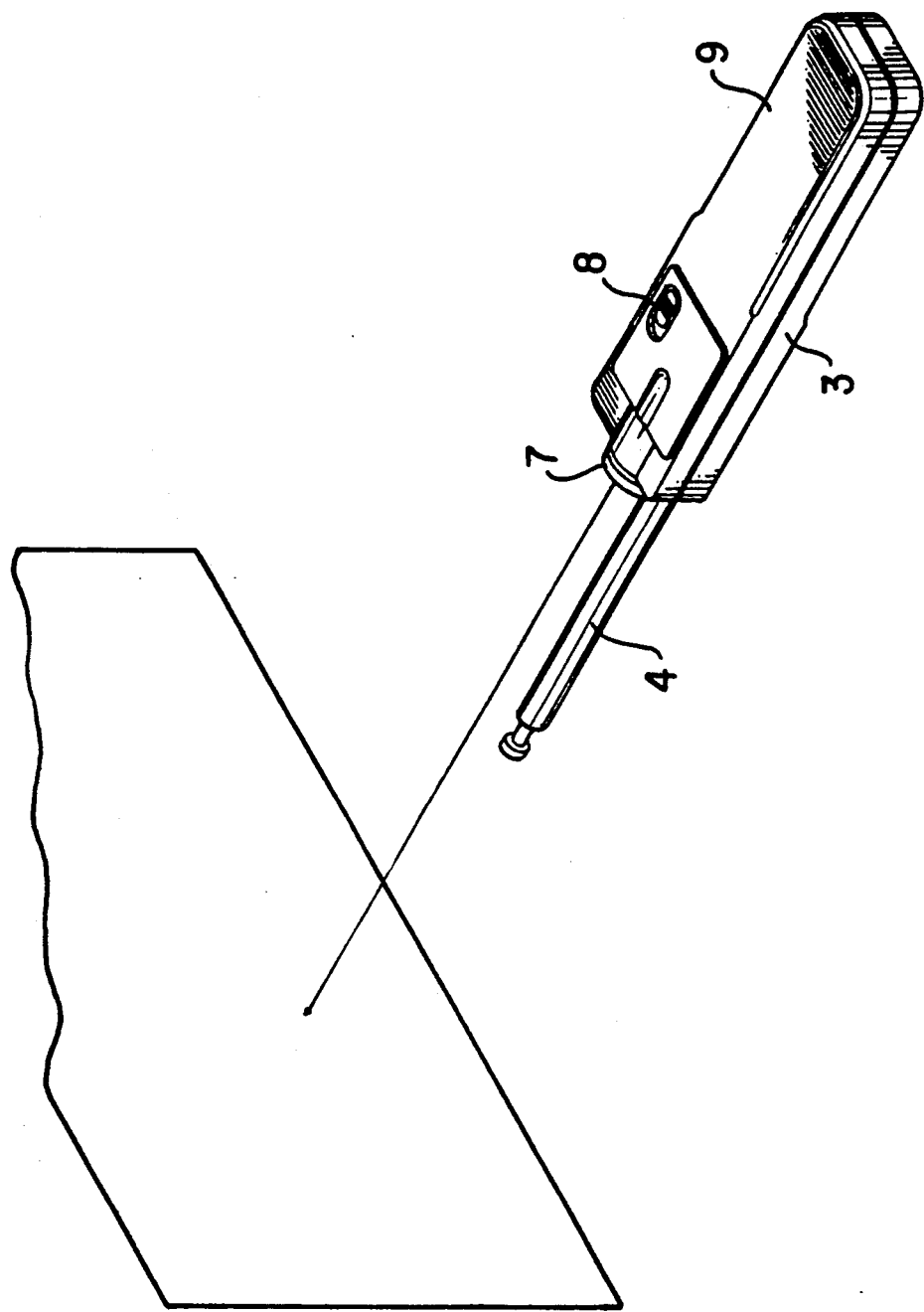
FIG. 5 illustrates the use of the present invention in projecting a light spot on a board for the purpose of pointing things.

Referring to FIG. 1, a laser pointer as constructed in accordance with the present invention is generally comprised of a projector 1, a light spot controller 2, a base 3, a telescopic stick 4, a telescopic stick supporting spring plate 5, a concealed microphone 6, a laser light generating PC board 7, a sliding switch knob 8, an upper cover 9, an U-shaped spring plate 10, a switch control hook 11, and a switch 12.

The projector 1 has a hole 1111 through the central axis thereof for passing laser light beam, an annular groove 1112 around the peripheral wall thereof, and an extension rod 1113 longitudinally projecting from the back end thereof for connection to the base 3.

The light spot controller 2 comprises a tapered big projecting hole 21, a tapered small projecting hole 22, two spaced rails 23 on the front face thereof defining a limited space 231 for moving the extension rod 1113, and a notch 24 and a raised portion 25 on the bottom edge thereof for positioning.

The base 3 comprises a semicircular front support 31, on to which the annular groove 1112 of the projector 1 is seated, a front chamber 311, in which the light spot control 2 is moved by rotating the projector 1, a side chamber 33, which receives the telescopic stick 4, an intermediate chamber, which receives the PC Board, a battery chamber 34 behind the intermediate chamber 322, which receives a dry battery set, front and rear hooks 35, 36 at two opposite ends, which hook up the upper cover 9, a semicircular rear support 331 in the side chamber 331 adjacent to the rear end of the battery chamber 34 to support the rear end of the telescopic stick 4, a rear chamber 333, which receives the concealed microphone 6, and a hole 332 on the inside adjacent to the rear end thereof, which receives the spring plate 5.

The telescopic stick 4 has an annular groove 41 around the peripheral wall adjacent to the rear end thereof, which is retained at the semicircular rear support 331 inside the base 3. When electricity is disconnected, the telescopic stick 4 is used as a pointer. Furthermore, the arrangement of the telescopic stick 4 simultaneously improves positive signal transmission from the concealed microphone.

The telescopic stick supporting spring plate 5 is fastened in the hole 332 with a contact flange 51 thereof stopped against the rear end of the telescopic stick 4.

The concealed microphone 6 is received inside the rear chamber 333. When pointing things out on a map, blackboard, etc. the use's speech is delivered through the concealed microphone 6.

The laser light generating PC Board 7 is fastened inside the intermediate chamber 32, and comprised of a laser diode and a trigger circuit (not shown).

The upper cover 9 comprises an endless groove 91 around a through hole 911, into which the sliding switch knob 8 is fastened, an U-shaped rail 92 raising from the bottom edge thereof, two raised portions 93,931 on the bottom edge thereof with a gap 94 defined between the U-shaped rail 92, a semicircular inner flange 95 on the front end thereof, which matches with the semicircular front support 31 to hold the projector 1, and front and rear hooks 96,97 respectively hooked up with the front and rear hooks 35,36 of the base 3.

The U-shaped spring plate 10 has a notch 101 to hold the sliding switch knob 8, and is set inside the U-shaped rail 92 on the bottom edge of the upper cover 9 to give a spring force to the switch control hook 11.

The switch control hook 11 has two holes 111,112 aligned into a stepped hole, a sloping front edge 113, and two symmetrical rear extension rods 114. The two symmetrical rear extension rods 114 are terminated into two hooked portions 115 which are moved to hook in or release from the gap 94 between the raised portions 93,931 and the U-shaped rail 92 in switching on/off the switch 12.

The sliding switch knob 8 has an embossed top surface 84 for positive contact of the fingers, and a split bottom rod 81 inserted in the 112. The split bottom rod 81 has an annular groove 81 around the peripheral wall thereof, onto which the U-shaped spring plate 10 is fastened, and a notch 811 on the tapered bottom end 82 thereof.

The switch 12 has a contact stub rod 121 inserted into the hole 111 and moved to electrically connect or disconnect the electric circuit of the PC Board 7 by means of the control of the switch knob 8.

Referring to FIG. 4, rotating the projector 1 causes the extension rod 1113 to move the light spot control 2 in the front chamber 311, permitting the laser light beam from the laser diode of the PC Board 7 to be projected through the projector 1 via the big projecting hole 21 or the small projecting hole 22.

Referring to FIGS. 4B-E moving the sliding switch knob 8 forwards causes the front sloping edge 113 of the switch control hook 11 to press against the U-shaped spring plate 10, permitting the contact stub rod 121 of the switch 12 to be pressed by the split bottom rod 81 in connecting the electric circuit of the PC Board 7; releasing the sliding switch knob 8 causes the switch 12 to electrically switching off the electric circuit of the PC Board 7, and therefore the sliding switch knob 8 can be moved back into its original "Off" position with the hooked portions 115 thereof respectively hooked in the gap 94. Because of the arrangement of the U-shaped spring plate 10, positive switching operation is ensured.

What is claimed is:

1. A laser pointer comprising:

a housing including an elongated hollow base and an upper cover, said base having a front end, opposing sides and a rear end said base defining a front chamber, an intermediate chamber and a rear chamber spaced between the front and rear ends and a side chamber extending along one side from the front end to the rear end;

a projector means including a projector having an opening along the central axis thereof for permitting a laser light beam to pass therethrough, said projector being rotatable mounted in the front chamber of said base and having a longitudinal rod projecting toward the rear end of said base;

light spot control means including a plate having a large diameter and a small diameter hole therethrough, slidably mounted adjacent the rear end of said projector and including means thereon in cooperation with said rod for moving one of said holes into alignment with the central axis of projector responsive to rotational movement of said projector;

telescope stick means mounted in the side chamber and retractably extending through the front end of said base;

laser light generating means including a PC board mounted in the intermediate chamber of said base, a laser diode and trigger circuit and switch means for activating or deactivating a laser beam and for projecting said beam through one of the holes in said light spot control means and subsequently through the central axis opening in said projector means;

said upper cover being releasably secured to said base and mounting a switch thereon coupled to said switch means for activating or deactivating a laser beam responsive to movement thereof; and a microphone means mounted in said rear chamber for amplifying sounds directed thereinto.

2. The laser pointer of claim 1 wherein said large diameter hole and said small diameter hole in said light spot control means has a predetermined circumferential configuration.

* * * * *